(12) United States Patent
Bollinger et al.

(10) Patent No.: US 11,066,051 B2
(45) Date of Patent: Jul. 20, 2021

(54) WHEEL SENSORS WITHIN VEHICULAR BRAKE ASSEMBLIES

(71) Applicant: Dexter Axle Company, Elkhart, IN (US)

(72) Inventors: Steven Ray Bollinger, Granger, IN (US); Markus Cloyd Carrison, Goshen, IN (US); Samuel Neil Lievore, Elkhart, IN (US)

(73) Assignee: Dexter Axle Company, Elkhart, IN (US)

( * ) Notice: Subject to any disclaimer, the term of this patent is extended or adjusted under 35 U.S.C. 154(b) by 0 days.

(21) Appl. No.: 16/661,727

(22) Filed: Oct. 23, 2019

(65) Prior Publication Data

US 2020/0122692 A1 Apr. 23, 2020

Related U.S. Application Data

(63) Continuation-in-part of application No. 16/350,268, filed on Oct. 23, 2018.

(51) Int. Cl.
| | |
|---|---|
| *G01M 17/007* | (2006.01) |
| *B60T 1/06* | (2006.01) |
| *F16D 51/22* | (2006.01) |
| *F16D 65/10* | (2006.01) |
| *F16D 65/22* | (2006.01) |
| *F16D 121/20* | (2012.01) |

(52) U.S. Cl.
CPC .............. *B60T 1/067* (2013.01); *F16D 51/22* (2013.01); *F16D 65/10* (2013.01); *F16D 65/22* (2013.01); *B60T 2240/00* (2013.01); *F16D 2121/20* (2013.01)

(58) Field of Classification Search
CPC ...... B60T 1/067; B60T 2240/00; F16D 51/22; F16D 65/10; F16D 65/22; F16D 2051/001; F16D 2065/13
USPC .......................................... 73/121, 129, 130
See application file for complete search history.

(56) References Cited

U.S. PATENT DOCUMENTS

| | | | | |
|---|---|---|---|---|
| 3,812,391 | A | * | 5/1974 | Johnson ................... G01P 3/488 310/168 |
| 4,698,536 | A | * | 10/1987 | Oohori ...................... B60T 1/06 188/181 A |
| 4,907,445 | A | * | 3/1990 | Okumura ............ B60B 27/0005 324/173 |
| 5,281,911 | A | * | 1/1994 | Caron ..................... G01P 3/488 324/174 |
| 5,476,272 | A | * | 12/1995 | Hixson, II .............. G01P 3/443 277/317 |

(Continued)

*Primary Examiner* — Eric S. McCall
(74) *Attorney, Agent, or Firm* — Botkin & Hall, LLP

(57) ABSTRACT

A drum braking system having a spindle and backing plate affixed thereto. The system includes a drum rotating on the spindle. The drum has an inside surface with integral notches that are machined or cast into the drum. When the brakes are applied, brake shoes are actuated to contact the inside surface to create drag between the drum and the spindle. A sensor is fixed with respect to the spindle or backing plate that detects the notches when the drum rotates about the spindle. A portion of the inside surface with the integral notches is shared with the brake shoes so that applying the brakes prevents buildup that could contact the sensor. The sensor is positioned radially to reduce the effect of drum endplay on detecting of the notches.

24 Claims, 12 Drawing Sheets

(56) References Cited

U.S. PATENT DOCUMENTS

| | | | | |
|---|---|---|---|---|
| 5,491,407 | A * | 2/1996 | Maxson | B60B 27/0005 324/174 |
| 5,678,933 | A * | 10/1997 | Ouchi | G01P 3/443 384/448 |
| 6,568,512 | B1 * | 5/2003 | Tolani | F16D 65/125 188/18 R |
| 2003/0047363 | A1 * | 3/2003 | Makuta | B62M 7/12 180/65.51 |
| 2003/0110860 | A1 * | 6/2003 | Okada | G01P 3/443 73/593 |
| 2003/0122539 | A1 * | 7/2003 | Heimann, Jr. | G01P 3/443 324/173 |
| 2003/0201766 | A1 * | 10/2003 | Faetanini | G01P 3/443 324/173 |
| 2003/0234578 | A1 * | 12/2003 | Takahashi | G01P 3/443 303/168 |
| 2004/0187581 | A1 * | 9/2004 | Kamiya | G01N 29/12 73/593 |
| 2006/0091723 | A1 * | 5/2006 | Pete | G01D 5/00 303/113.1 |
| 2006/0124411 | A1 * | 6/2006 | Redgrave | G01D 5/147 188/218 XL |
| 2010/0288411 | A1 * | 11/2010 | Loewe | B60C 23/043 152/419 |
| 2011/0067963 | A1 * | 3/2011 | Pahle | F16D 65/12 188/218 XL |
| 2013/0255366 | A1 * | 10/2013 | Seglo | F16D 65/60 73/121 |
| 2018/0290637 | A1 * | 10/2018 | White | B60T 8/54 |
| 2019/0101565 | A1 * | 4/2019 | Buchwitz | G01P 3/481 |
| 2019/0309810 | A1 * | 10/2019 | Sabeti | B60T 8/329 |
| 2020/0122692 | A1 * | 4/2020 | Bollinger | F16D 51/22 |

* cited by examiner

WHEEL SENSORS WITHIN VEHICULAR BRAKE ASSEMBLIES

CROSS REFERENCE TO RELATED APPLICATIONS

This application is a Continuation-in-Part of U.S. application Ser. No. 16/350,268 filed Oct. 23, 2018, the disclosure of which is hereby incorporated by reference.

BACKGROUND OF THE INVENTION

The present invention relates generally to wheel sensors used to detect speed and/or other operating conditions, and more particularly, the present invention relates to wheel speed sensors for towable trailers, such as cargo, industrial utility, and recreational vehicle (RV) trailers, using electric brake systems. For antilock braking systems, the system needs to measure the wheel speed during braking to determine if a wheel becomes locked up. If the system detects a locked wheel, the system will release the braking force until the wheel begins to turn again. Other systems currently use a separate tone ring or wheel that is secured to the rotating parts, such as an axle, braking component, or wheel. A reliable method of detecting wheel speed is needed.

Various brake systems are available for use with vehicles, including hydraulic and electrically actuated brake systems. For larger brake systems, and, particularly for hydraulic brake systems, there are various solutions presently known for monitoring wheel and brake performance. In general, there are fewer spacial constraints for mounting sensors to such larger and hydraulic brake systems. Also, these systems tend to be more expensive as an overall system, so the additional cost of including performance sensors is a lower percentage of the total system cost, and that cost tends to be more readily absorbed by vehicle manufacturers, purchasers, and users.

However, for smaller brake systems, such as those used in towed RV trailers, and for electric brake systems, there are typically significant spacial constraints to placement of wheel sensors. Further, in such brake systems, sensor placement may not be able to be consistent across all brake sizes, and sensor operation can be significantly affected by variations in trailer loading and/or during vehicle turning and maneuvers when, for example, the hub-drum can move somewhat relative to the brake backing plate. Also, some prior wheel sensor systems were susceptible to damage and/or adverse impact on sensor signal reliability from road debris and exposure to the external environment. In addition, in smaller and less expensive brake systems, the additional costs associated with using reliable and durable wheel sensors are more noticeable to the purchaser of those systems.

OBJECTIVES OF THE INVENTION

Accordingly, a primary objective of the present invention is to provide an improved sensing orientation and configuration system for brake assemblies. These improvements include providing apparatus for detecting wheel speed and/or other operating characteristics which are inexpensive to manufacture and maintain, increase traffic safety during vehicle operation, minimize component weight, facilitate use and repair, and are durable and reliable over extended use and with a wider variety of vehicles. Further, tolerance of endplay of rotating components without losing the ability to detect wheel speed is an objective.

SUMMARY OF THE INVENTION

These and other objectives of the present invention are achieved by the provision of detectable indicia on the interior diameter surface or circumferential rim of the brake hub-drum adjacent to, and spaced apart from, the backing plate or another structural member of the brake. A sensor is fixed with respect to the backing plate to detect wheel speed and/or other operating conditions detectable from the motion and/or relative location or condition of those indicia. The number of indicia used and the indicia spacing along the interior circumferential rim is selected as needed for a given type of sensor and/or a given application. In the case of a speed sensor, the indicia can be a series of notches in the rim along the entire interior circumferential rim, resembling a series of "teeth" into that rim. The width of those teeth can be formed wide enough to accommodate movement of the hub-drum relative to the backing plate and/or the sensor, without loss of system functionality, according to the sensing tolerances of a given sensor being used in a given application.

Other objects, advantages, and novel features of the present invention will become readily apparent from the following drawings and detailed description of certain preferred and alternative embodiments.

DESCRIPTION OF THE PREFERRED EMBODIMENT

Figure 1:
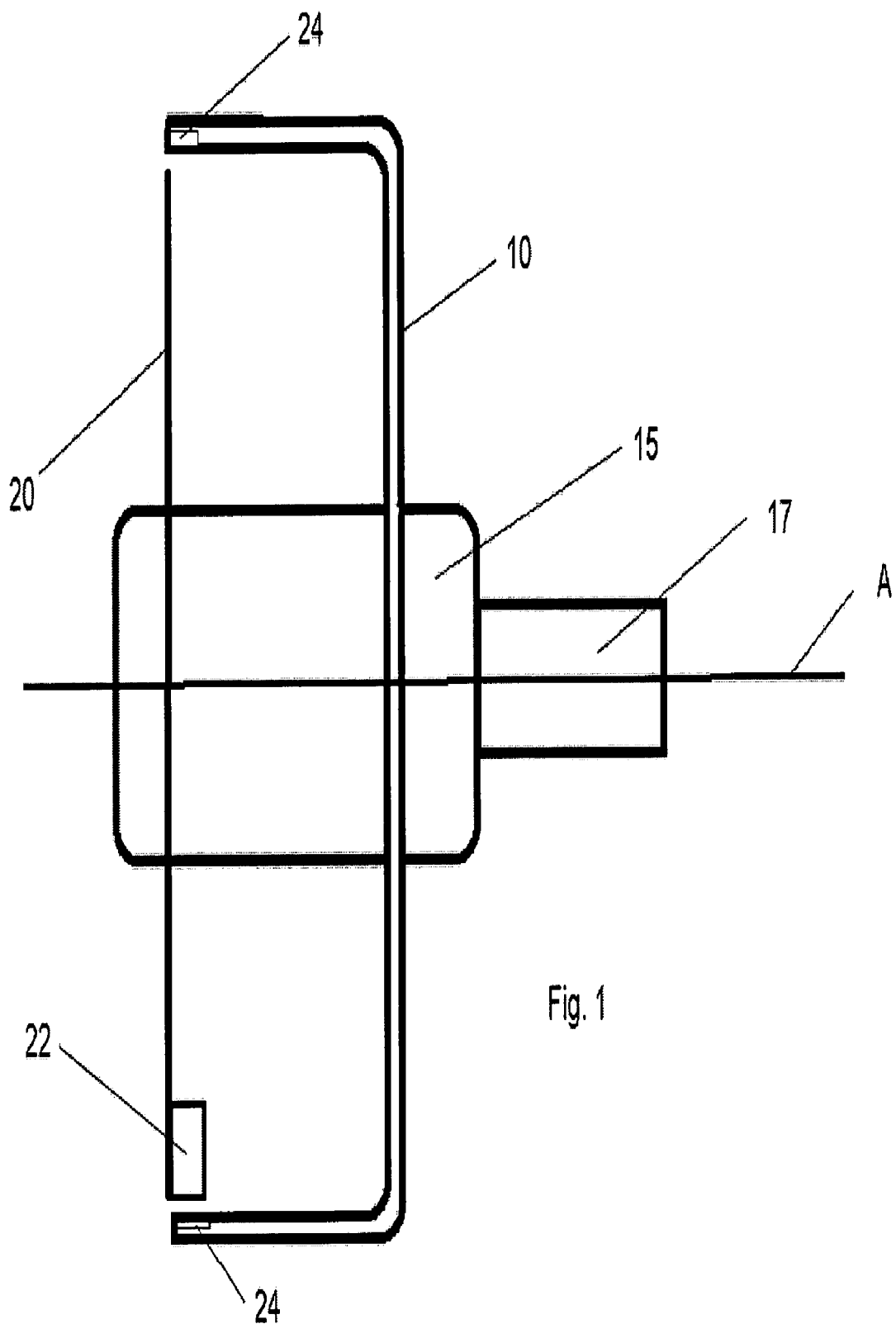
FIG. 1 shows a cross-sectional view of a trailer brake hub and drum assembly, taken through the axis of rotation, with the teachings of the present invention applied thereto.
Figure 7:
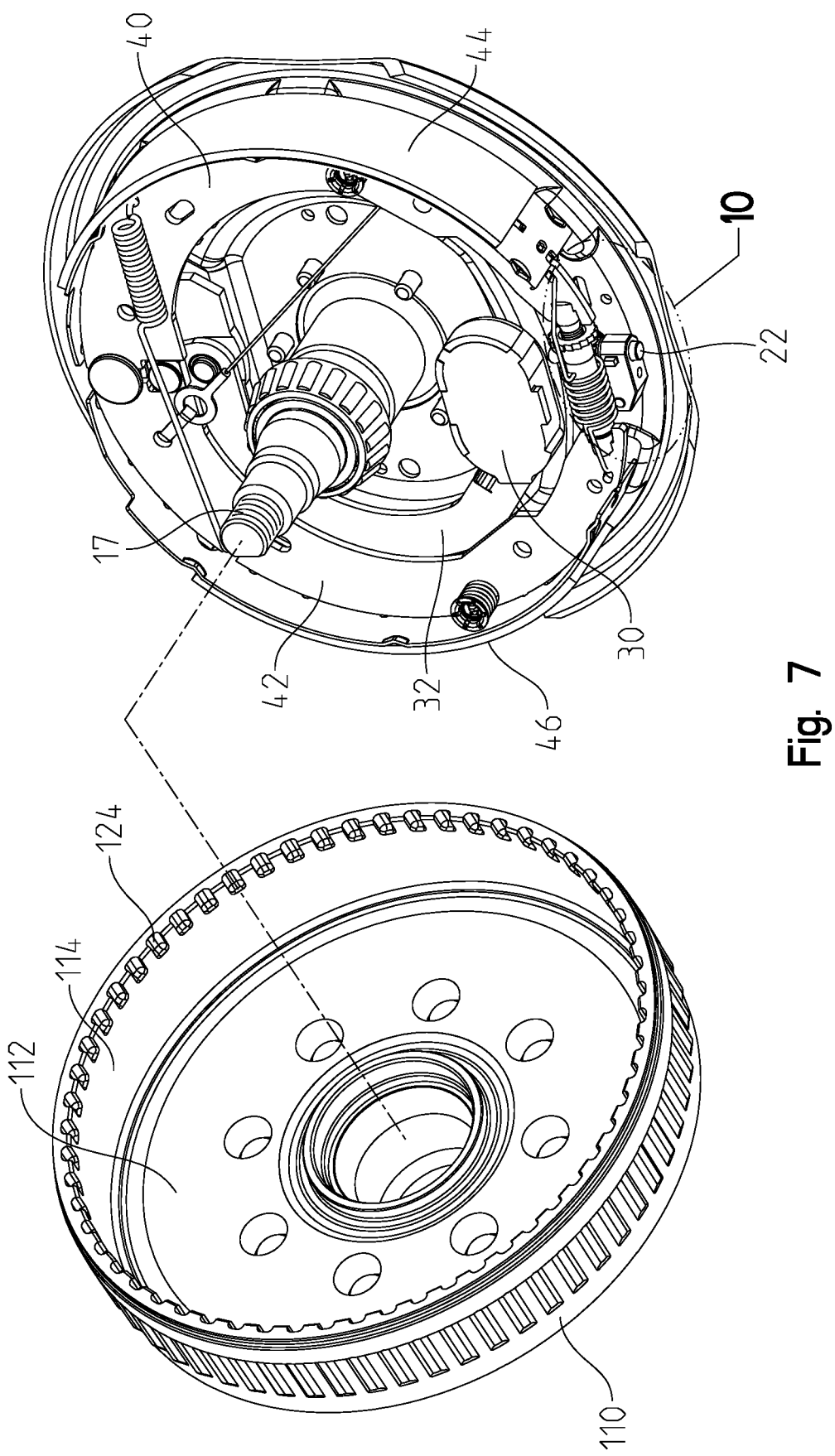
FIG. 7 is a partially exploded isometric view of the brake hub and drum assembly in FIG. 5.

FIG. 1 shows a trailer drum 10 and hub 15, oriented with respect to a conventional backing plate 20 of a brake system (such as an electric brake for a cargo, industrial utility or RV trailer), as mounted on spindle or axle 17 for rotation about axis A. In this embodiment, the present invention includes the provision of at least one sensor 22 on the enclosed side of backing plate 20, facing the interior of drum 10. Preferably, sensor 22 is mounted near the circumferential periphery of backing plate 20, and spaced apart from the interior circumferential rim of drum 10. The interior circumferential rim of the drum 10, 110 has a cylindrical inside drum surface 114, shown in FIG. 7. The number of sensors mounted on backing plate 20, and the type of sensor device used for sensor 22 in a given application, can be selected according to the operating conditions desired to be detected, and the relative cost and reliability of a given type of sensor.

At least one detectable notch or indicia 24 is mounted on or formed into the interior circumferential rim of drum 10, at one or more locations spaced apart from sensor 22, but within the detectable range of the sensing tolerance of a given sensor 22 being used for a given application of the present invention. As shown in the drawings, the detectable indicia illustrated is a notch or "tooth" cast, cut, machined, or otherwise formed into the interior circumferential rim of drum 10. In such instances, sensor 22 can, for example, be a Hall effect or magnetic sensor device, such as a variable reluctance sensor. In other applications, sensor 22 can be an optical device, detecting light intensity variations as indicia 24 pass close by. As backing plate 20 and drum 10 rotate relative to each other, sensor 22 and indicia 24 will pass close to each other, enough so that sensor 22 will detect that event, and pass the information along to a conventional remote operational indicator, monitor, or control device. The sensor 22 generates an electrical signal through a sensor wire 56. The electrical signal is received by a brake controller (not shown) or other electrical interface that communicates with a brake controller. Also, according to the type of sensor being used, and/or the operational conditions being monitored, the detectable indicia may instead be reflective tape, an illumination source, a thermal emitter, or the like.

Placing the sensor and the detectable indicia within the enclosure defined by the brake hub-drum and the backing plate serves to give greater protection for the sensor against road debris and the operating environment. This placement also can be consistent between different sized brake systems. Further, this placement is often sufficiently tolerant of variations in trailer load, trailer turning/maneuvers, bearing end play, and other disturbances which can impact the spacing and orientation of brake components, that sensor signal reliability is not adversely affected, particularly where the size (width, for example) of the detectable indicia is established for a given application, by reference to the sensor range, capacity, and expected usage environment. Also, in given applications, mounting the detectable indicia at this location allows the sensor to be mounted directly to form fitting features incorporated into other brake components. As desired in a given application or embodiment of this invention, sensor 22 can be mounted at any angle relative to the circumferential edge of backing plate 20. Further, this mounting arrangement can take advantage of the "self-cleaning" characteristics of brake drums to maintain sensor reliability, and the fact that brake drums tend to be more resistant to adverse deflection issues which would affect the sensor/indicia air gap. Depending upon the operating characteristics being detected, indicia 24 can be spaced apart equally or at varying distances from each other. Also, indicia 24 can be of a uniform size and shape in certain applications, or formed of different sizes and shapes for other detection purposes.

Figure 2:
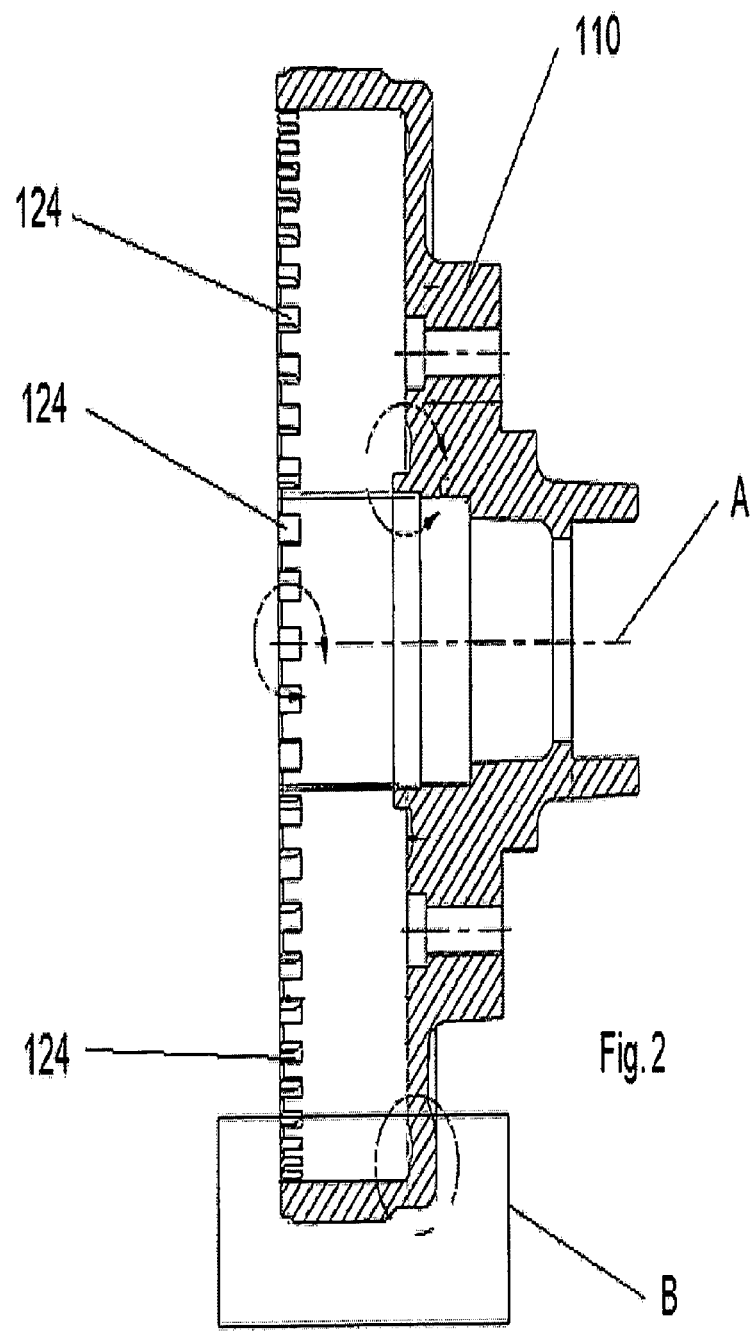
FIG. 2 shows a cross-sectional view of the brake hub-drum of a preferred embodiment of the present invention, taken through the axis of rotation.
Figure 3:
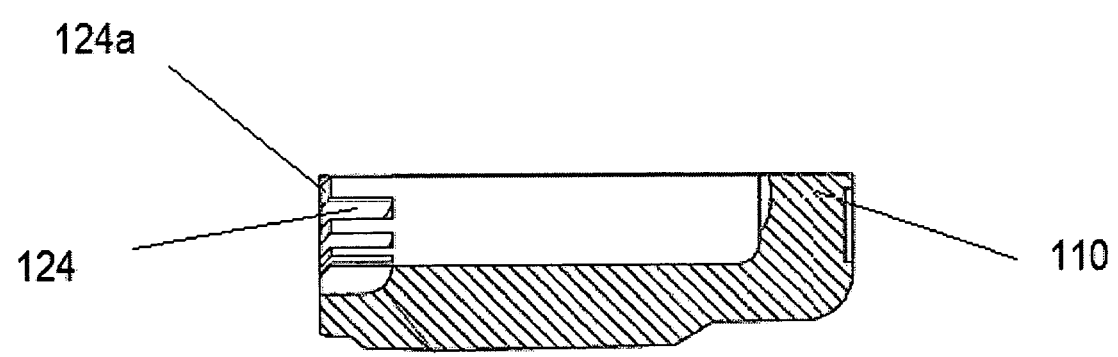
FIG. 3 shows an enlarged cross-sectional view of portion B of FIG. 2.

FIG. 2 shows a preferred embodiment of trailer hub-drum 110 according to the teachings of the present invention, with notches or indicia 124 used for sensing wheel speed formed in the interior circumference of the drum rim. In this application, indicia 124 can, for example, be a formed as a plurality of teeth cut or cast into the interior circumferential rim, and in a pattern equally spaced apart along the entire interior rim. Using wider teeth than sensor 22 would otherwise require for such indicia, allows the wheel speed to be reliably detected regardless of vehicle loading and other angular movement forces relative to the sensor/indicia orientation. According to the requirements for a given application, indicia 124 can include a chamfer or inclined end 124a. Also, in given applications the sensor and/or indicia 124 can be partially exposed to the environment outside of the enclosure created between hub-drum 110 and the backing plate. In given applications, the backing plate can be mounted further within hub-drum 110, and/or the sensor can be mounted on the exposed side of the backing plate. In a given application, the sensor may be mounted to slide over the indicia, rather than move past the indicia spaced apart therefrom.

Figure 4:
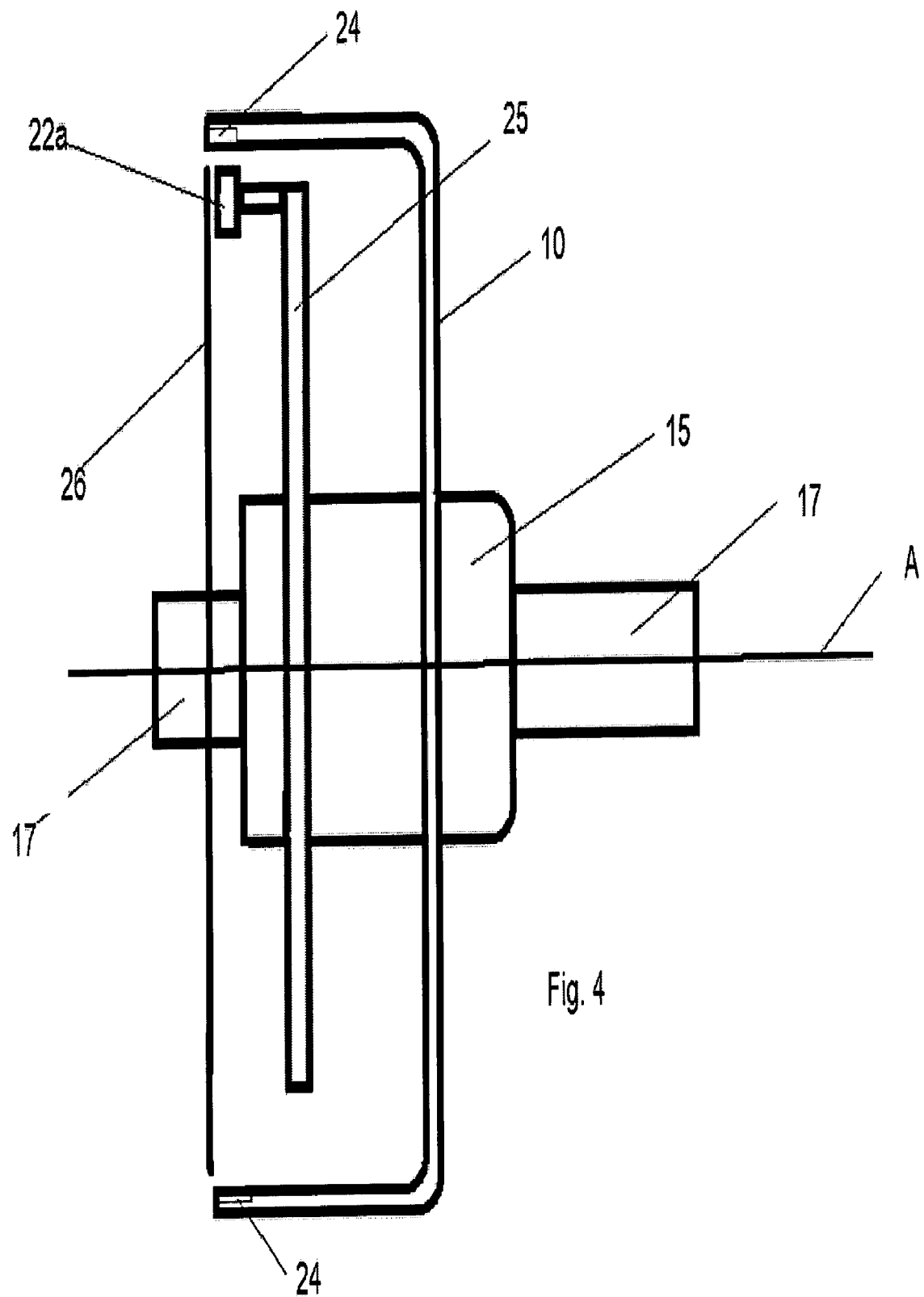
FIG. 4 shows a cross-sectional view of an alternative trailer hub and drum assembly, taken through the axis of rotation, according to the present invention.
Figure 5:
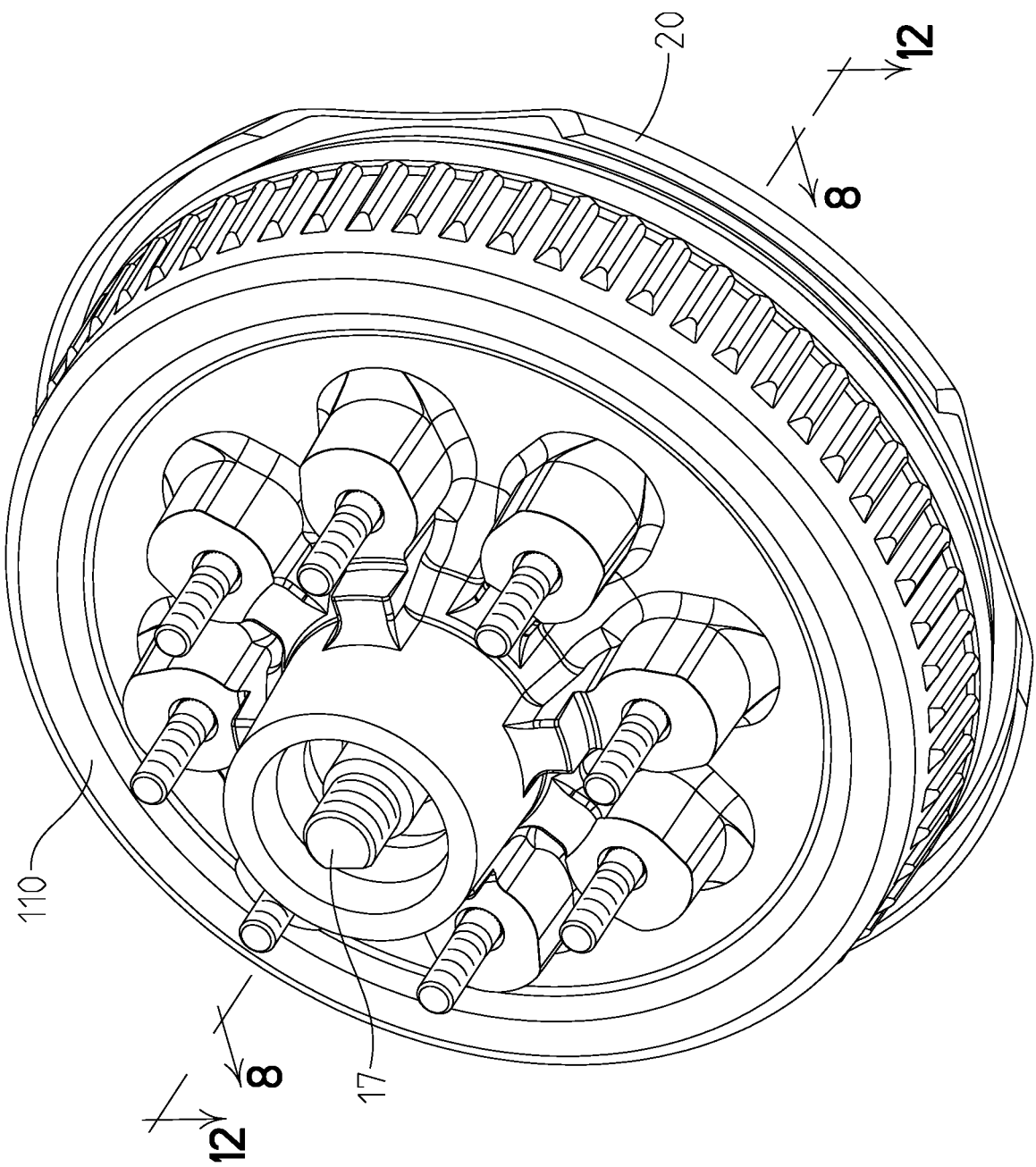
FIG. 5 is an isometric front view of a brake hub and drum assembly.
Figure 6:
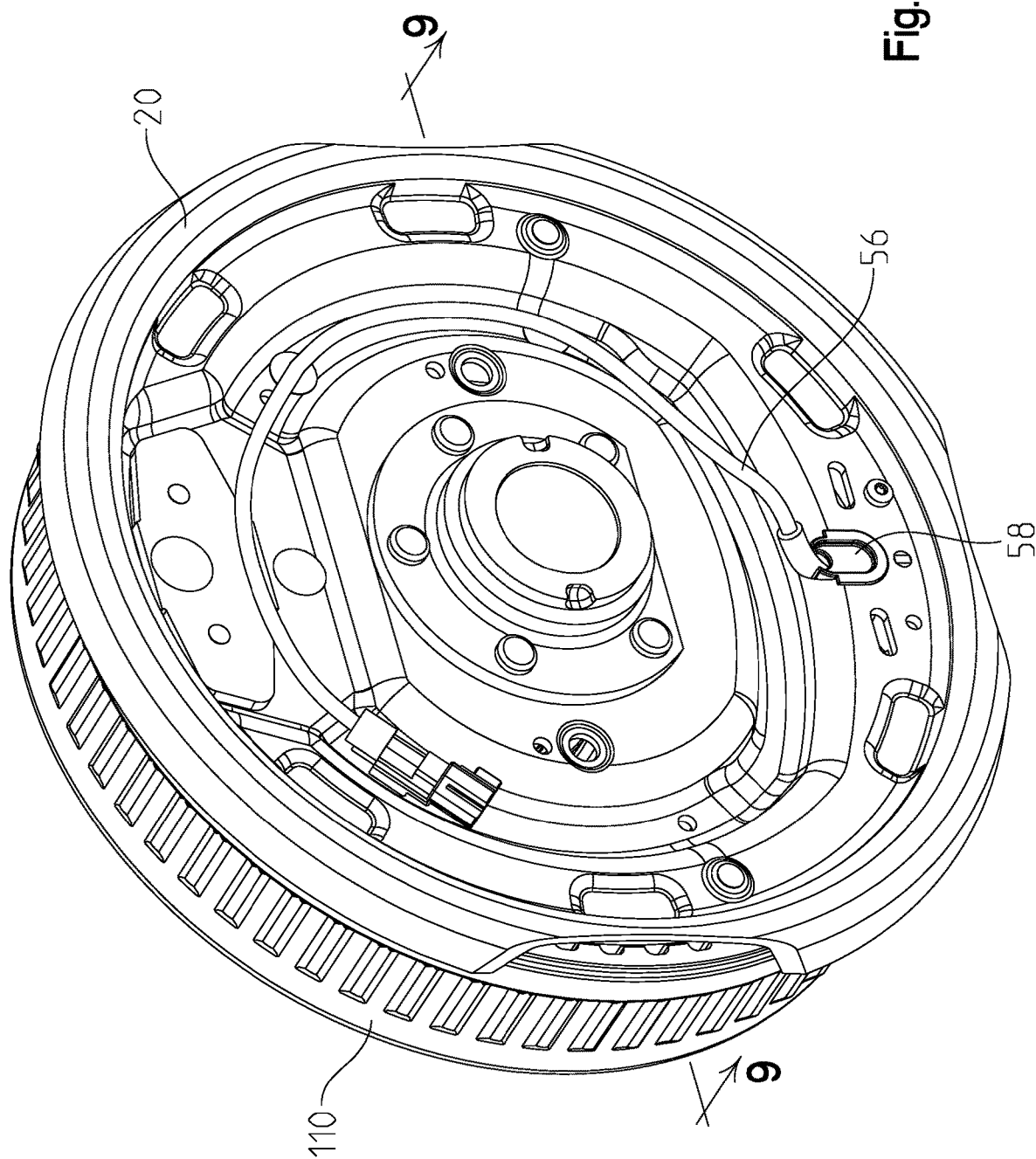
FIG. 6 is an isometric rear view of the brake hub and drum assembly as shown in FIG. 5.

Although the present invention has been shown and described herein with respect to certain preferred embodiments and alternative configurations, those were by way of illustration and example only. For example, FIG. 4 shows another preferred embodiment of the present invention. Therein, the corresponding sensor 22a is mounted to a brake structural member at its radial or circumferential periphery, such as a cast iron spider 25, which is at least partially covered by a debris shield 26 spaced apart from the spider along Axis A. Similarly, the present invention could be applied to hydraulic brake systems using a rotatable brake drum.

Figure 8:
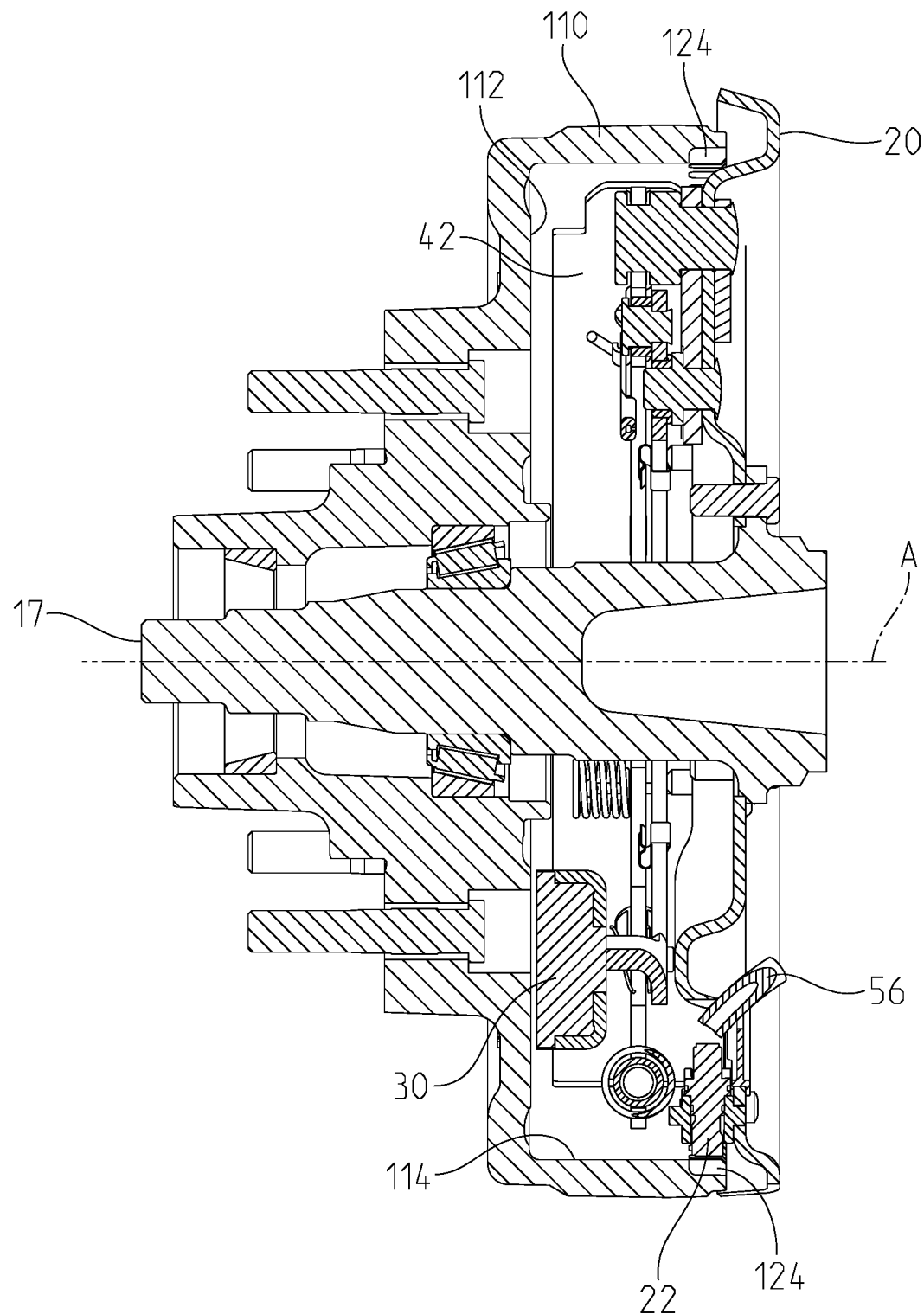
FIG. 8 is a side section 8-8 of the brake hub and drum assembly in FIG. 5.
Figure 9:
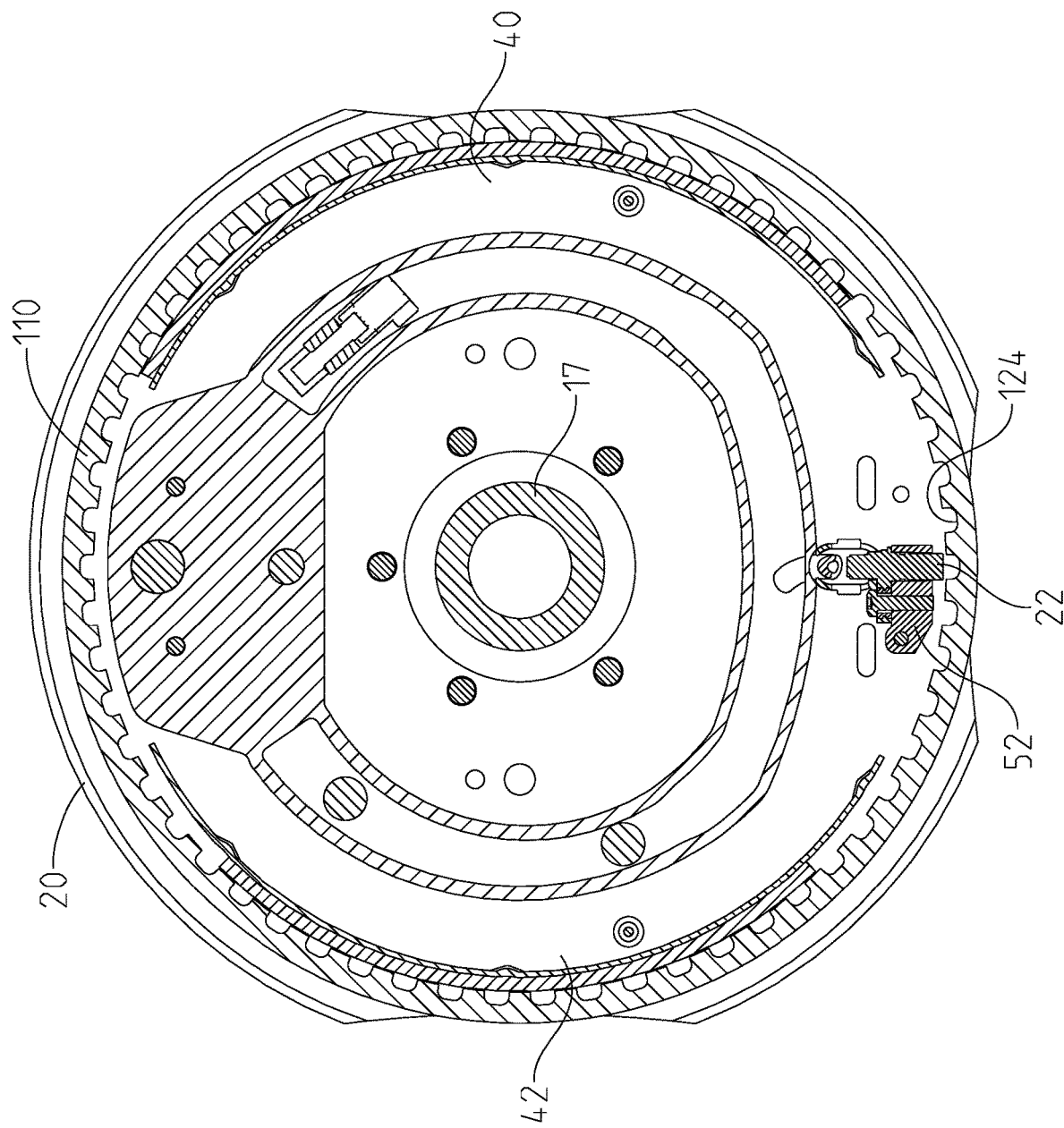
FIG. 9 is a front section 9-9 of the brake hub and drum assembly in FIG. 6.

Whether the axle uses a hub 15 and drum 10, or hub-drum 110, both are used with a drum braking system. FIGS. 5-12 show the invention in use with a hub-drum 110. The braking system shown herein is electrically-actuated, but other types of actuation are contemplated, such as hydraulic or pneumatic. Brake shoes 40, 42 are held to the backing plate 20 and can move between a retracted and extended position. The retracted position allows the drum 10, 110 to rotate with little resistance and the extended position causes drag between the drum 10, 110 and spindle or backing plate. In the electrically-actuated system, an electromagnet 30 is connected to an arm 32 that pivots. The electromagnet 30 is in light contact with or very close to the face surface 112 of the drum 10 or hub-drum 110. As the drum 10, 110 rotates, the electromagnet 30 lightly rubs the face surface 112 but little to no drag force is exerted on the electromagnet 30. As an electrical current is applied to the electromagnet 30, the electromagnet 30 begins to drag against the rotating face surface 112, which causes the arm 32 to pivot. As the arm 32 pivots, the brake shoes 40, 42 are driven outwardly toward the extended position, creating drag between the brake shoes 40, 42 and drum 10, 110. The brake shoes 40, 42 have corresponding wear surfaces 44, 46 that make contact with the inside drum surface 114, which is an internal circumferential surface. The wear surfaces 44, 46 have a width 48, shown in FIG. 12. The inside drum surface 114 has a width 116. The inside drum surface 114 is commonly a bare metal surface and is not treated with any coatings to prevent rust. The inside drum surface 114 commonly forms some level of surface rust when the device is not in use. When the brakes are applied, the wear surfaces 44, 46 contact and apply force to the inside drum surface 114, quickly wearing away any surface rust. As is shown in FIG. 12, the indicia 124 extend into the inside drum surface 114, which is shared with the wear surfaces 44, 46. This is also shown in FIG. 9, which is taken through the center of the sensor 22. As is shown, the brake shoes 40, 42 contact the same portion of the inside drum surface 114 with the indicia 124. Any rust that could have built up on the inside drum surface 114 is cleared off once the vehicle is moved and the brakes are applied. Rust, brake dust, or debris may build up in the individual notches or indicia 124, but any buildup will not extend inwardly beyond the inside drum surface 114, due to the overlap of the brake shoes 40, 42. Further, the buildup does not have the same level of magnetic conductivity, so the sensor 22 can still detect the notches 24, 124.

Figure 10:
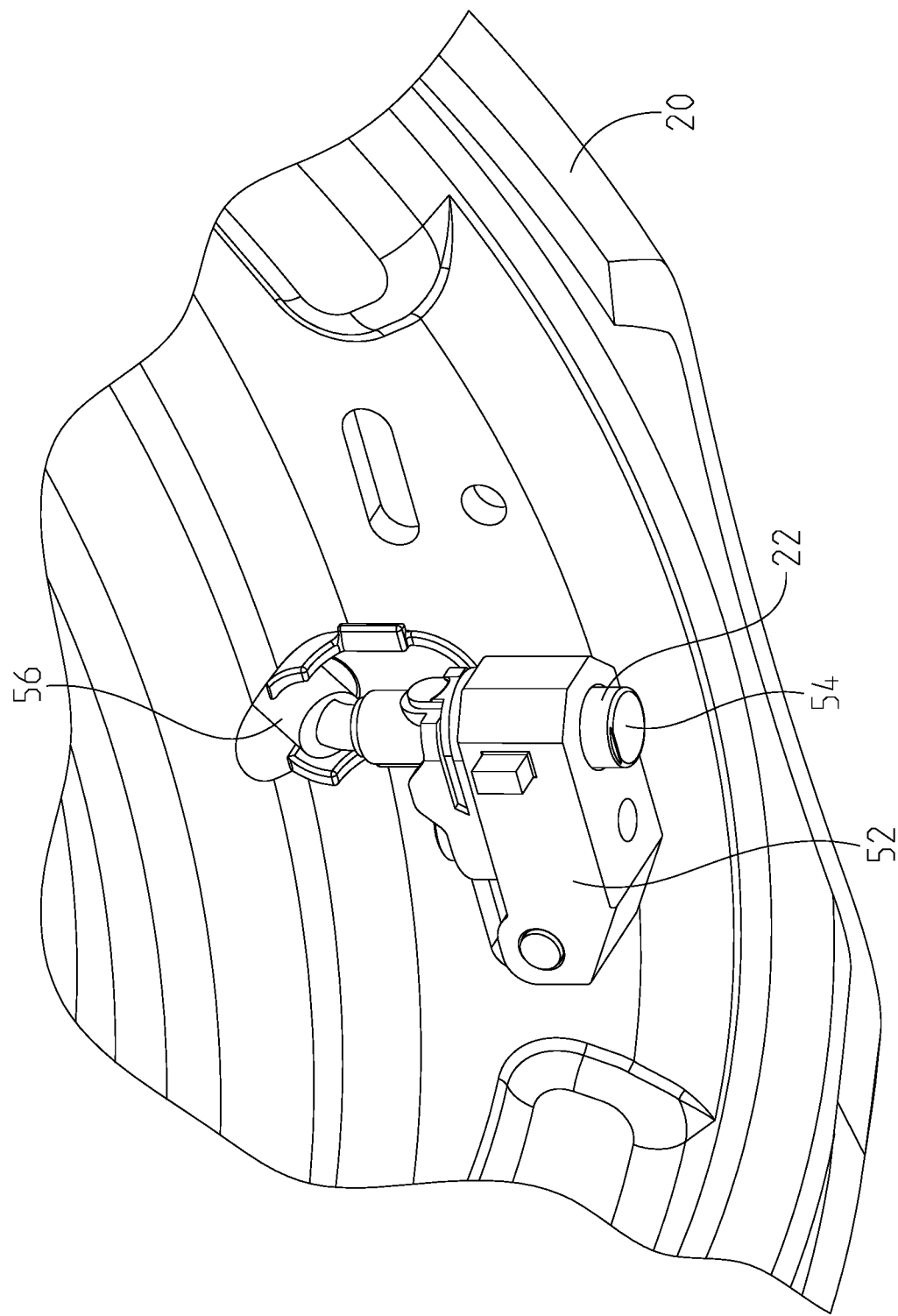
FIG. 10 is a partial isometric view 10 of the brake hub and drum assembly in FIG. 7.
Figure 11:
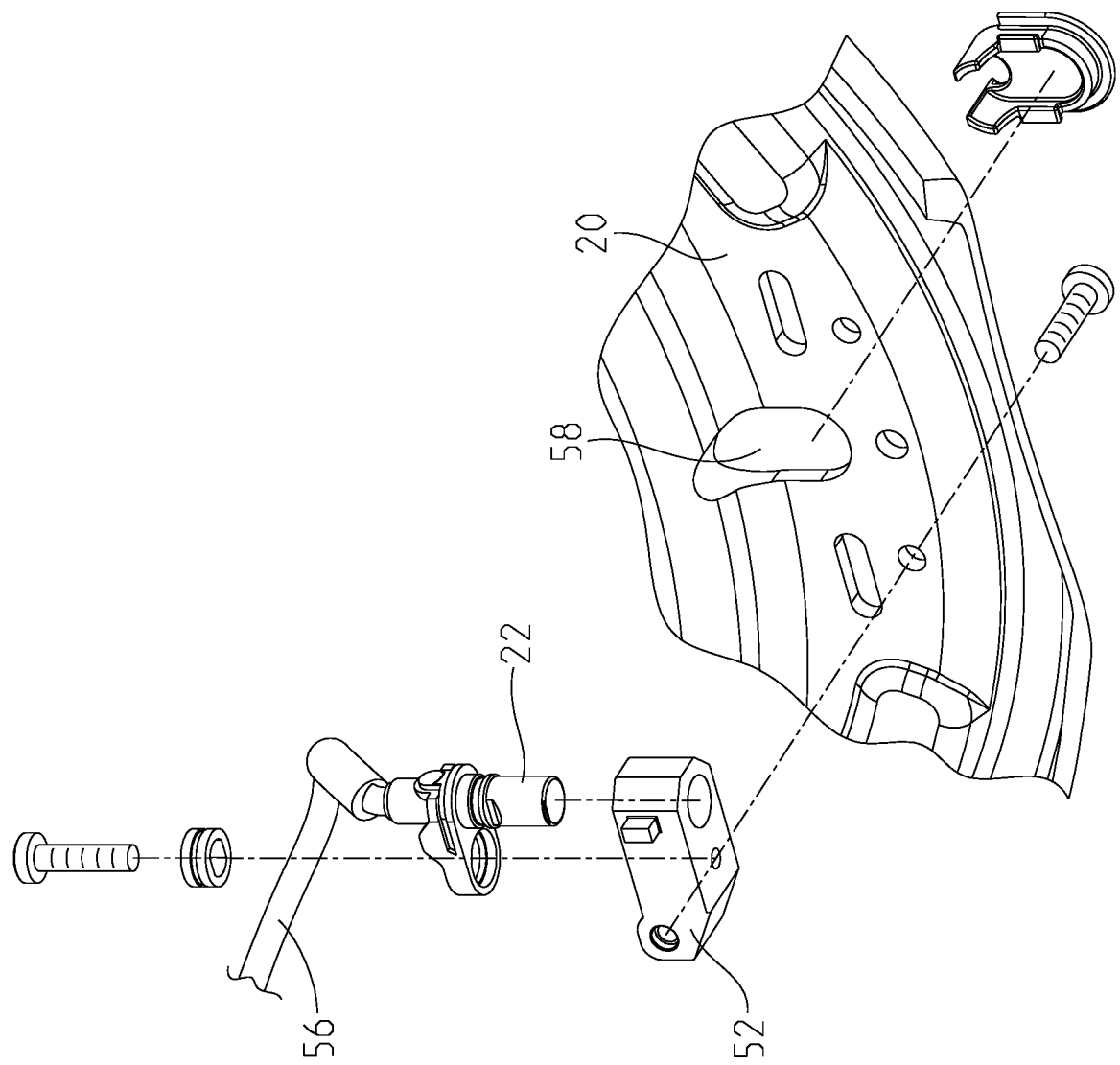
FIG. 11 is an exploded view of the sensor shown in FIG. 10.
Figure 12:
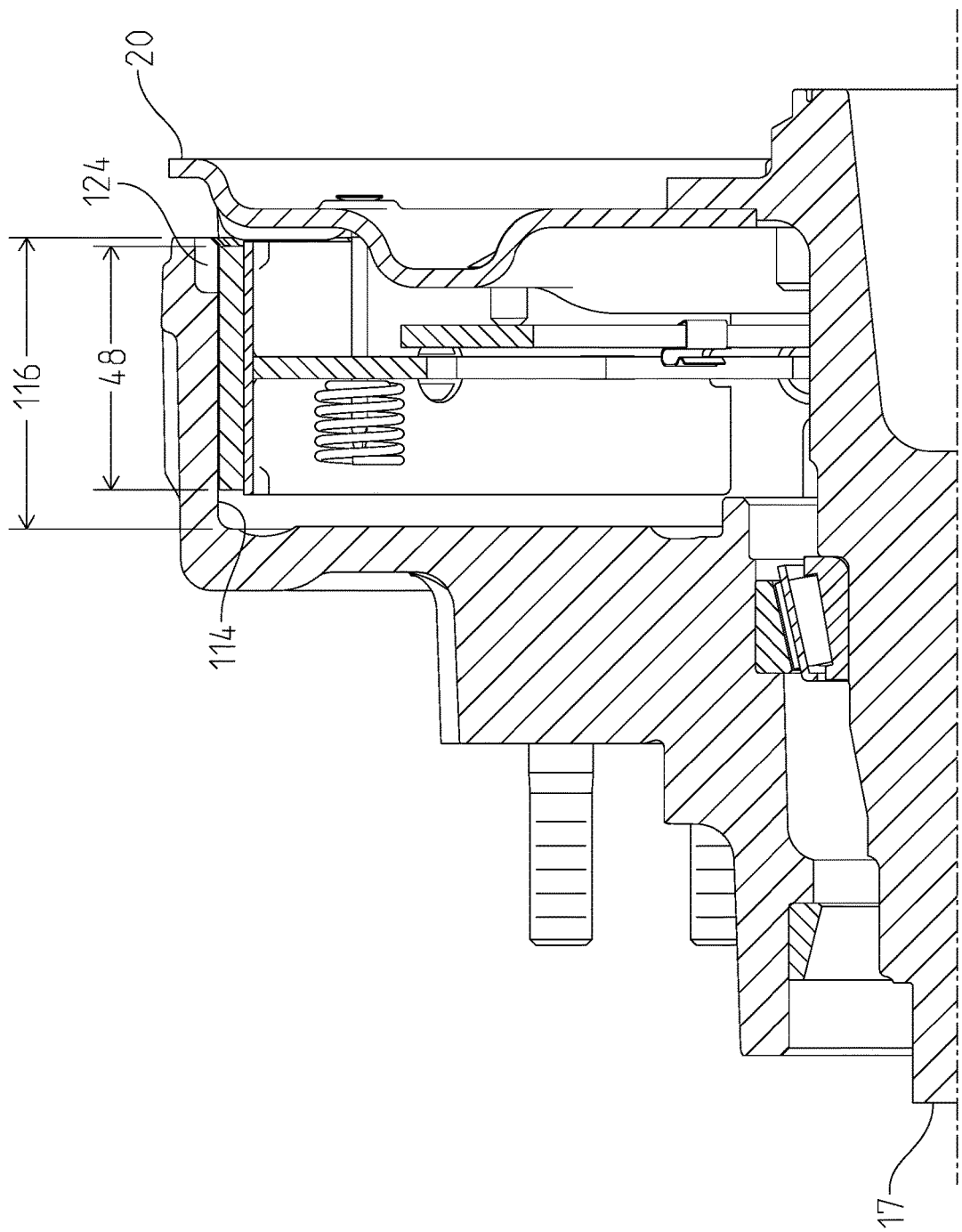
FIG. 12 is a side section 12-12 of the brake hub and drum assembly in FIG. 5.

As shown in FIGS. 10, 11, the sensor 22 may be affixed to the backing plate 20 through a bracket 52 that provides a secure and stable position. Alternatively, the mounting bracket may be integrated into the sensor body. The sensor 22 has an end surface 54 that is distanced from the inside drum surface 114 by an airgap. The end surface 54 is where the sensor 22 is sensitive to the movement or placement of the indicia 24, 124. As shown in FIGS. 1 and 8, the sensor 22 is positioned to face radially outwardly from axis A. As shown in FIG. 10, the sensor wire 56 passes through an aperture 58 in the backing plate 20, where it is routed to a controller. The sensor 22 as shown is cylindrical that attaches to the bracket 52, but other sensor shapes or mounting arrangements are contemplated. What all sensor designs have in common is that the sensing area of the sensor faces the inside drum surface 114. In other words, the sensor senses in a direction that faces radially outwardly from axis A.

As bearings wear, endplay causes the drum 10, 110 to move along axis A, with the drum 10, 110 moving farther and closer to the backing plate 20. Because the sensor 22 is facing radially outwardly, axial movement of the drum 10, 110 is inherently tolerated. With endplay of the drum 10, 110, the indicia 124 move side-to-side across the end surface 54, but the airgap remains substantially unchanged. The mounting as described herein is different from an axially mounted sensor, where the sensor would be sensing in a direction parallel to axis A. If the sensor was mounted to sense parallel to axis A, any endplay causes an undesirable increase in airgap where the sensor stops detecting or sensor gets damaged from contacting rotating parts.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A brake assembly for a trailer, said brake assembly comprising:
   a backing plate fixed with respect to a spindle;
   a brake drum rotatable on said spindle about a central axis of rotation, said brake drum having an internal cylindrical surface spaced from said central axis, a plurality of notches equally spaced and integrally formed into said brake drum, said notches interrupting a portion of said internal cylindrical surface, said notches adjacent said backing plate and spaced from said central axis at a distance greater than said internal cylindrical surface;
   brake shoes connected to said backing plate and movable between a retracted position and an extended position, said brake shoes having wear surfaces for contacting said internal cylindrical surface when said brake shoes move from said retracted position towards said extended position, a portion of said wear surfaces overlay said equally spaced notches;
   an electromagnet coupled to said brake shoes, said drum having a face surface, said electromagnet contacting said face surface, when said drum is rotating with respect to said spindle and an electrical current is passed through said electromagnet, said electromagnet moves said brake shoes from said retracted position towards said extended position;
   a sensor fixed with respect to said backing plate, said sensor located adjacent said internal cylindrical surface, said sensor having an end surface overlaying said notches; and
   when said brake drum rotates, said sensor detects said notches.

2. The brake assembly of claim 1, wherein said internal cylindrical surface is self-cleaning.

3. The brake assembly of claim 1, wherein said brake drum and said backing plate form an enclosure, said sensor is located in said enclosure, said notches are located on said internal cylindrical surface at a position adjacent said backing plate.

4. The brake assembly of claim 1, wherein said notches are cast into said drum.

5. The brake assembly of claim 1, wherein said notches are machined into said drum.

6. The brake assembly of claim 1, wherein said brake drum has an endplay defined by axial movement along said central axis, said notches detectable by said sensor throughout said endplay.

7. A brake assembly, said brake assembly comprising:
   a backing plate fixed with respect to a spindle;
   a brake drum rotatable on said spindle about a central axis of rotation, said brake drum having an internal cylindrical surface spaced from said central axis, a plurality of indicia formed into said brake drum, said indicia interrupting a portion of said internal cylindrical surface, said indicia spaced from said central axis at a distance greater than said internal cylindrical surface;
   brake shoes connected to said backing plate and movable between a retracted position and an extended position, said brake shoes having wear surfaces for contacting said internal cylindrical surface when said brake shoes move from said retracted position towards said extended position, a portion of said wear surfaces overlay said indicia;
   a sensor fixed with respect to said backing plate, said sensor located adjacent said internal cylindrical surface, said sensor having an end surface overlaying said indicia;
   an electromagnet coupled to said brake shoes, said drum having a face surface said electromagnet contacting said face surface, when said drum is rotating with respect to said spindle and an electrical current is passed through said electromagnet said electromagnet moves said brake shoes from said retracted position towards said extended position; and
   when said brake drum rotates, said sensor detects said indicia.

8. The brake assembly of claim 7, said indicia are located on said internal cylindrical surface closest to said backing plate.

9. The brake assembly of claim 7, wherein said indicia are a plurality of equally spaced notches.

10. The brake assembly of claim 7, wherein said indicia are notches cut into said interior cylindrical surface.

11. The brake assembly of claim 7, wherein said indicia are notches formed into said interior cylindrical surface.

12. The brake assembly of claim 7, wherein said sensor detects said indicia using magnetic fields.

13. The brake assembly of claim 12, wherein said sensor is a Hall effect sensor.

14. The brake assembly of claim 12, wherein said sensor uses variable reluctance.

15. A brake assembly, said brake assembly comprising:
a backing plate fixed with respect to a spindle;
a brake drum rotatable on said spindle about a central axis of rotation, said brake drum having an internal cylindrical surface spaced from said central axis, a plurality of indicia formed into said brake drum, said indicia interrupting a portion of said internal cylindrical surface, said indicia spaced from said central axis at a distance greater than said internal cylindrical surface;
brake shoes connected to said backing plate and movable between a retracted position and an extended position, said brake shoes having wear surfaces for contacting said internal cylindrical surface when said brake shoes move from said retracted position towards said extended position, a portion of said wear surfaces overlay said indicia;
a hall effect sensor fixed with respect to said backing plate, said sensor located adjacent said internal cylindrical surface, said sensor having an end surface overlaying said indicia; and
when said brake drum rotates, said sensor detects said indicia using magnetic fields.

16. The brake assembly of claim 15, said indicia are located on said internal cylindrical surface closest to said backing plate.

17. The brake assembly of claim 15, wherein said indicia are a plurality of equally spaced notches.

18. The brake assembly of claim 15, wherein said indicia are notches cut into said interior cylindrical surface.

19. The brake assembly of claim 15, wherein said indicia are notches formed into said interior cylindrical surface.

20. A brake assembly, said brake assembly comprising:
a backing plate fixed with respect to a spindle;
a brake drum rotatable on said spindle about a central axis of rotation, said brake drum having an internal cylindrical surface spaced from said central axis, a plurality of indicia formed into said brake drum, said indicia interrupting a portion of said internal cylindrical surface, said indicia spaced from said central axis at a distance greater than said internal cylindrical surface;
brake shoes connected to said backing plate and movable between a retracted position and an extended position, said brake shoes having wear surfaces for contacting said internal cylindrical surface when said brake shoes move from said retracted position towards said extended position, a portion of said wear surfaces overlay said indicia;
a variable reluctance sensor fixed with respect to said backing plate, said sensor located adjacent said internal cylindrical surface, said sensor having an end surface overlaying said indicia; and
when said brake drum rotates, said sensor detects said indicia using magnetic fields.

21. The brake assembly of claim 20, said indicia are located on said internal cylindrical surface closest to said backing plate.

22. The brake assembly of claim 20, wherein said indicia are a plurality of equally spaced notches.

23. The brake assembly of claim 20, wherein said indicia are notches cut into said interior cylindrical surface.

24. The brake assembly of claim 20, wherein said indicia are notches formed into said interior cylindrical surface.

* * * * *